(12) United States Patent
Tang et al.

(10) Patent No.: US 10,289,841 B2
(45) Date of Patent: May 14, 2019

(54) GRAPH-BASED ATTACK CHAIN DISCOVERY IN ENTERPRISE SECURITY SYSTEMS

(71) Applicant: NEC Laboratories America, Inc., Princeton, NJ (US)

(72) Inventors: LuAn Tang, Pennington, NJ (US); Hengtong Zhang, Princeton, NJ (US); Zhengzhang Chen, Princeton Junction, NJ (US); Bo Zong, Plainsboro, NJ (US); Zhichun Li, Princeton, NJ (US); Guofei Jiang, Princeton, NJ (US); Kenji Yoshihira, Princeton Junction, NJ (US)

(73) Assignee: NEC Corporation, Tokyo (JP)

( * ) Notice: Subject to any disclaimer, the term of this patent is extended or adjusted under 35 U.S.C. 154(b) by 76 days.

(21) Appl. No.: 15/725,974

(22) Filed: Oct. 5, 2017

(65) Prior Publication Data
US 2018/0032724 A1     Feb. 1, 2018

Related U.S. Application Data

(63) Continuation-in-part of application No. 15/098,861, filed on Apr. 14, 2016.

(60) Provisional application No. 62/148,232, filed on Apr. 16, 2015, provisional application No. 62/407,573, filed on Oct. 13, 2016, provisional application No. 62/407,576, filed on Oct. 13, 2016.

(51) Int. Cl.
*G06F 21/55*     (2013.01)
*H04L 12/24*     (2006.01)
*H04L 29/06*     (2006.01)
*G06F 21/57*     (2013.01)

(52) U.S. Cl.
CPC .......... *G06F 21/554* (2013.01); *G06F 21/552* (2013.01); *G06F 21/577* (2013.01); *H04L 41/12* (2013.01); *H04L 41/142* (2013.01); *H04L 41/145* (2013.01); *H04L 63/1416* (2013.01); *H04L 63/1425* (2013.01); *H04L 63/1433* (2013.01)

(58) Field of Classification Search
CPC .... G06F 21/554; G06F 21/552; G06F 21/577; H04L 41/142; H04L 41/12; H04L 41/145; H04L 63/1425; H04L 63/145; H04L 63/1416; H04L 63/1433
See application file for complete search history.

(56) References Cited

U.S. PATENT DOCUMENTS 9,292,695 B1 *  3/2016  Bassett ................. G06F 21/577
9,363,149 B1 *  6/2016  Chauhan ............... G06F 16/951
(Continued)

*Primary Examiner* — Darren B Schwartz
(74) *Attorney, Agent, or Firm* — Joseph Kolodka

(57) ABSTRACT

Methods and systems for detecting anomalous events include detecting anomalous events in monitored system data. An event correlation graph is generated based on the monitored system data that characterizes the tendency of processes to access system targets. Kill chains are generated that connect malicious events over a span of time from the event correlation graph that characterize events in an attack path over time by sorting events according to a maliciousness value and determining at least one sub-graph within the event correlation graph with an above-threshold maliciousness rank. A security management action is performed based on the kill chains.

18 Claims, 5 Drawing Sheets

(56) References Cited

U.S. PATENT DOCUMENTS

| | | |
|---|---|---|
| 2014/0215618 A1 | 7/2014 | Amit |
| 2014/0283026 A1 | 9/2014 | Amit |
| 2016/0065601 A1* | 3/2016 | Gong .................. G06F 21/561 726/23 |
| 2016/0078229 A1* | 3/2016 | Gong .................. G06F 21/577 726/24 |
| 2016/0205122 A1* | 7/2016 | Bassett ............... G06F 21/577 726/23 |
| 2016/0301704 A1* | 10/2016 | Hassanzadeh ...... H04L 63/0209 |
| 2016/0301709 A1* | 10/2016 | Hassanzadeh ...... H04L 63/1433 |
| 2018/0013787 A1* | 1/2018 | Jiang ..................... H04L 29/06 |
| 2018/0359264 A1* | 12/2018 | Sweet .................. G06F 21/577 |

* cited by examiner

GRAPH-BASED ATTACK CHAIN DISCOVERY IN ENTERPRISE SECURITY SYSTEMS

RELATED APPLICATION INFORMATION

This application is a continuation-in-part of co-pending application Ser. No. 15/098,861, filed on Apr. 14, 2016, which in turn claims priority to provisional application Ser. No. 62/148,232, filed on Apr. 16, 2015, both of which are incorporated herein by reference in their entirety. This application further claims priority to provisional application Ser. Nos. 62/407,573 and 62/407,576, filed on Oct. 13, 2016, both of which are incorporated herein in their entirety.

BACKGROUND

Technical Field

The present invention relates to computer and network security and, more particularly, to discovery of attack chains from system monitoring logs.

Description of the Related Art

Enterprise networks are key systems in corporations and they carry the vast majority of mission-critical information. As a result of their importance, these networks are often the targets of attack. Communications on enterprise networks are therefore frequently monitored and analyzed to detect anomalous network communication as a step toward detecting attacks.

In particular, advanced persistent threat (APT) attacks, which persistently use multiple complex phases to penetrate a targeted network and steal confidential information, have become major threats to enterprise information systems. Existing rule/feature-based approaches for APT detection may only discover isolated phases of an attack. As a result, these approaches may suffer from a high false-positive rate and cannot provide a high-level picture of the whole attack.

SUMMARY

A method for detecting anomalous events include detecting anomalous events in monitored system data. An event correlation graph is generated based on the monitored system data that characterizes the tendency of processes to access system targets. Kill chains are generated that connect malicious events over a span of time from the event correlation graph that characterize events in an attack path over time by sorting events according to a maliciousness value and determining at least one sub-graph within the event correlation graph with an above-threshold maliciousness rank. A security management action is performed based on the kill chains.

A system for detecting anomalous events includes an anomaly detection module configured to detect anomalous events in monitored system data. A kill chain module includes a processor configured to generate an event correlation graph based on the monitored system data that characterizes the tendency of processes to access system targets and to generate kill chains that connect malicious events over a span of time from the event correlation graph that characterize events in an attack path over time by sorting events according to a maliciousness value and determining at least one sub-graph within the event correlation graph with an above-threshold maliciousness rank. A security module is configured to perform a security management action based on the kill chains.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, the present embodiments provide a two-stage framework that takes massive system monitoring logs and record-level alert labels and recovers well-organized attack chains (also referred to herein as "kill chains"). The present embodiments thereby decrease the false positive rate of alert labels. The two-stage framework constructs an event correlation graph from the monitored log data and then generates kill chains from the event correlation graph.

In an advanced persistent threat (APT) graph, most attack steps are well-camouflaged as normal events whose malicious intent cannot be readily determined. At the same time, rule-based event detectors will generate false positives, marking innocuous events as being potentially malicious. It can be difficult for a system administrator to locate and recover real APT attacks from a high volume of false positives. The kill chains discovered by the present embodiments can be generated automatically and can be part of a fully automated security system that does not involve the direct intervention by an administrator. No prior knowledge about the attack is needed, nor are any labeled training datasets used.

This problem is a result of the fact that isolated events do not provide enough contextual information to determine that they are malicious. To this end, the present embodiments jointly consider multiple alerts and normal events to more accurately identify APT attacks. The present embodiments therefore output graphs of linked events that recover the procedures of possible APT attacks, referred to herein as "kill chains."

Figure 1:
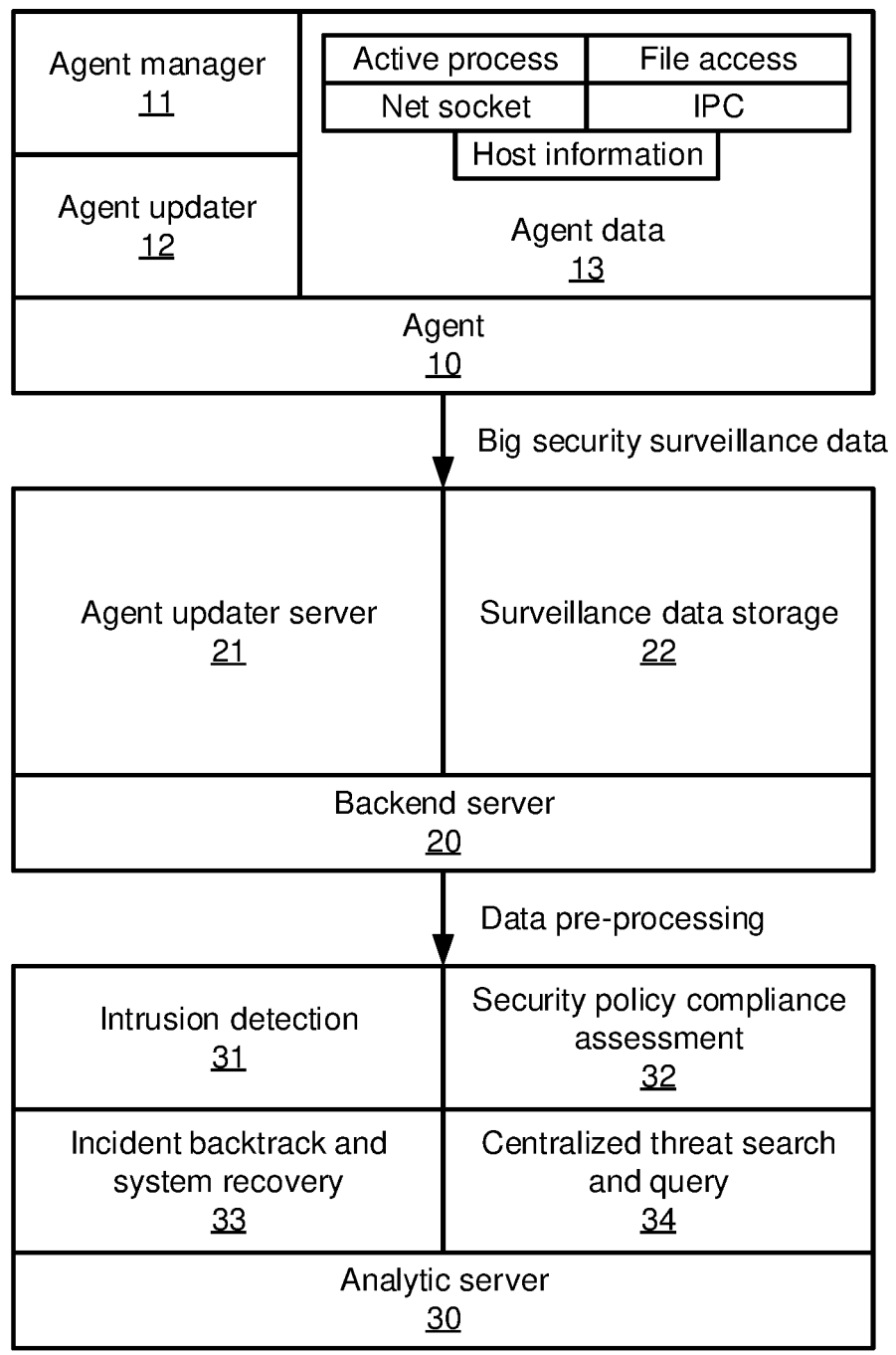
FIG. 1 is a block/flow diagram directed to an automatic security intelligence system architecture in accordance with an embodiment of the present principles.

Referring now in detail to the figures in which like numerals represent the same or similar elements and initially to FIG. 1, an automatic security intelligence system (ASI) architecture is shown. The ASI system includes three major components: an agent 10 is installed in each machine of an enterprise network to collect operational data; backend servers 200 receive data from the agents 10, pre-process the data, and sends the pre-processed data to an analysis server 30; and an analysis server 30 that runs the security application program to analyze the data.

Each agent 10 includes an agent manager 11, an agent updater 12, and agent data 13, which in turn may include information regarding active processes, file access, net sockets, number of instructions per cycle, and host information. The backend server 20 includes an agent updater server 21 and surveillance data storage. Analysis server 30 includes intrusion detection 31, security policy compliance assessment 32, incident backtrack and system recovery 33, and centralized threat search and query 34.

Figure 2:
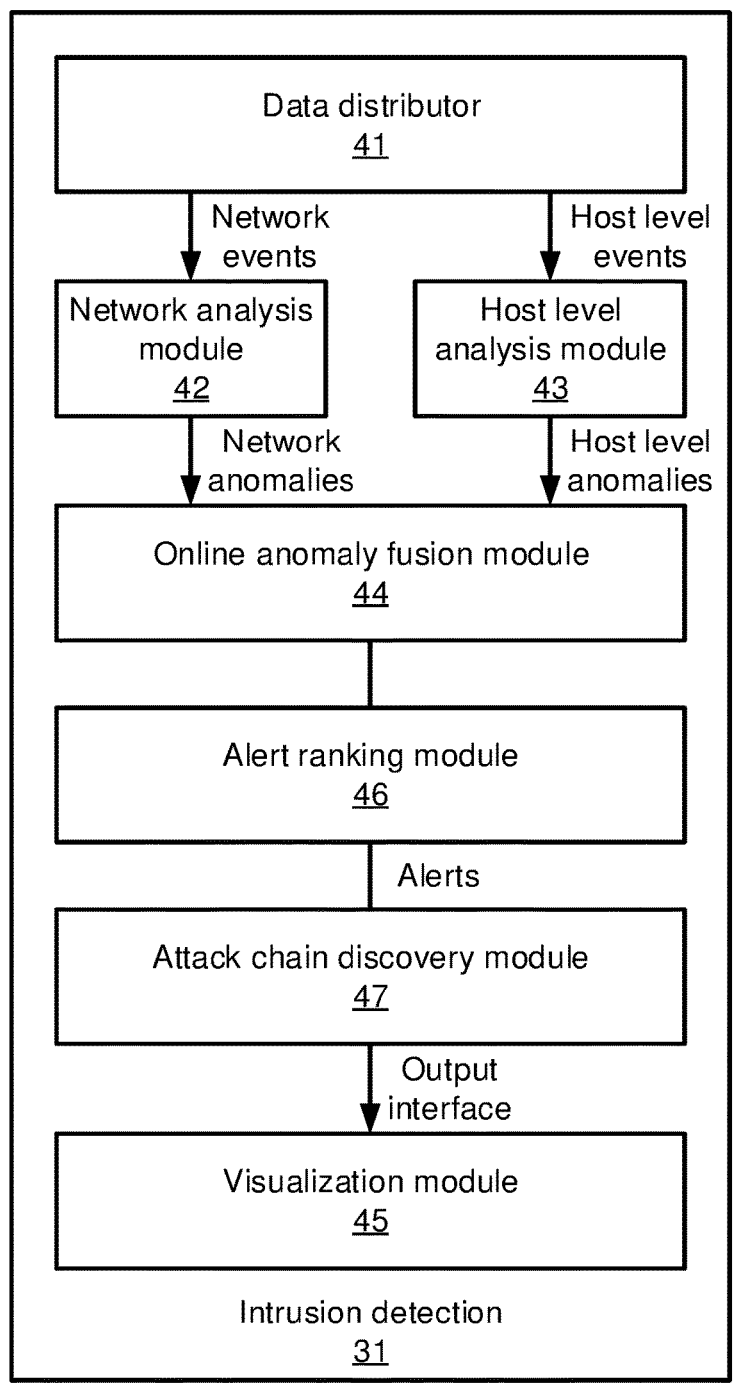
FIG. 2 is a block/flow diagram directed to an intrusion detection engine architecture in accordance with an embodiment of the present principles.

Referring now to FIG. 2, additional detail on intrusion detection 31 is shown. There are five modules in an intrusion detection engine: a data distributor 41 that receives the data from backend server 20 and distributes the corresponding to network level module 42 and host level module 43; network analysis module 42 that processes the network communications (including TCP and UDP) and detects abnormal communication events; host level analysis module 43 that processes host level events, including user-to-process events, process-to-file events, and user-to-registry events; anomaly fusion module 44 that integrates network level anomalies and host level anomalies and refines the results for trustworthy intrusion events; alert ranking module 46 that takes the intrusion events and ranks them according to degree of suspicion; attack chain discovery module 47 that filters out untrustworthy alerts (e.g., by removing alerts that have a rank or degree of suspicion below a threshold value) and organizes trustworthy alerts into kill chains; and visualization module 45 that outputs the detection results to end users.

Figure 3:
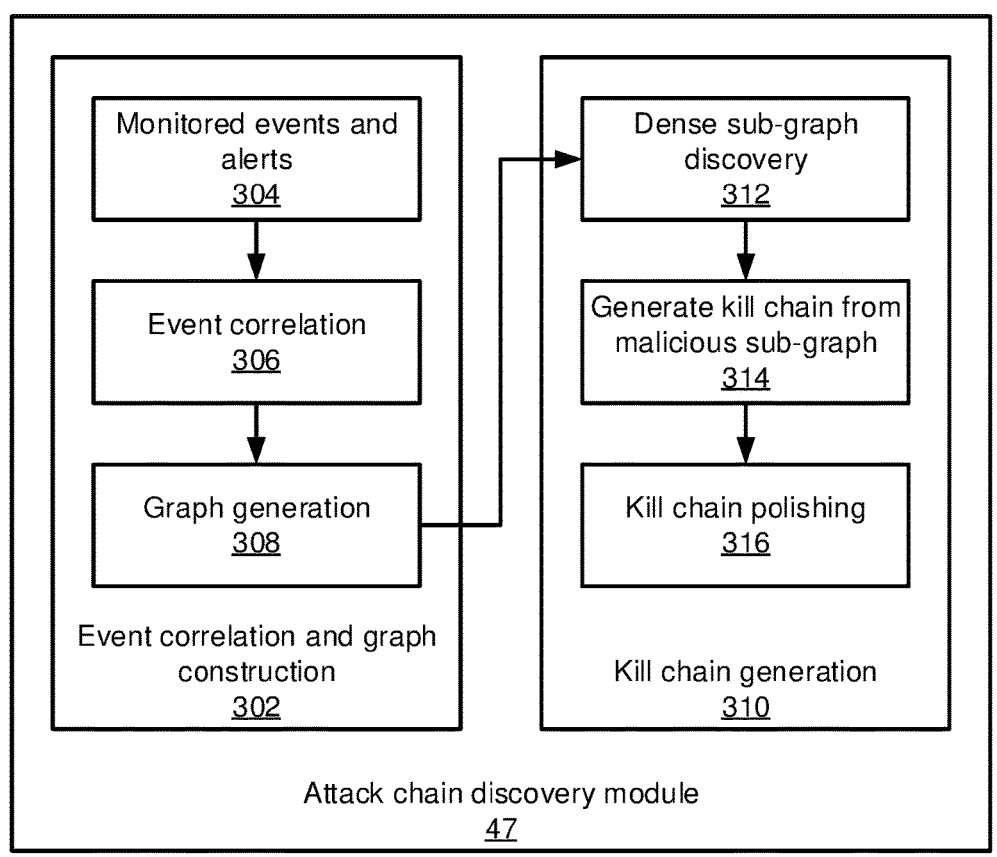
FIG. 3 is a block/flow diagram of a method/system for discovering attack chains in accordance with an embodiment of the present principles.

Referring now to FIG. 3, additional detail on the attack chain discovery module 46 is shown. As noted above, kill chain discovery includes two stages: event correlation/graph construction block 302 and kill chain generation 310. In the first stage 302, the present embodiments learn the behavioral characteristics of processes as well as the interactive patterns that occur between processes, further discovering the correlations among isolated system events. The monitored system events and alerts are provided as input 304 to the event correlation/graph construction block 302. Event correlation is performed in block 306 and an event triggering graph is created in block 308.

In kill chain generation 310, a greedy algorithm may be used to generate sub-graphs in block 312, the sub-graphs having a high likelihood of representing the procedures of APT attacks. Block 314 generates a kill chain from the malicious sub-graph to identify malicious events and organize them into meaningful stories. Block 316 then polishes and refines the kill chains.

Each system event that is input in block 304 can be represented as a four-tuple $(i_v, t_v, d_v, \delta_v)$, where $i_v$ is an index among all the events, $i_v$ is a host process of the $v^{th}$ event, $t_v$ is the timestamp for the $v^{th}$ event, $d_v$ is the target (e.g., documents, network addresses, etc.) of the $v^{th}$ event, and $\delta_v$ is the malicious label generated by the analysis engine (though it should be noted that this label may be incorrect). The set of all system events is denoted as $$O = \{(I_v, t_v, d_v, \delta_v)\}_{\{v=1\}}^{\{|O|\}}.$$

The present embodiments accomplish the following goals:

1. Construct a directed event correlation graph: G={V, E, w}, where each vertex vεV in the graph corresponds to an observed system event and each edge eεE corresponds to an event triggering correlation, which is inferred from the sequence of system events. The function w:V→ℝ denotes a function that assigns a non-negative value w(v) to each event v based on the anomaly labels generated by the analysis engine (the online anomaly fusion module 44).

2. Find subsets of events S⊂V which have high maliciousness scores and are sufficiently compact. The subgraphs that include these subsets of events are considered as kill-chains.

Thus the first stage 302 finds triggering correlations among isolated events, making use of use of Hawkes processes to model the event data and then describing the proposed model that learns the triggering correlations from observed system sequences.

Hawkes processes are a family of counting processes that model sequences of "event arrivals" over time. Each event arrival "excites" the process by increasing the likelihood of event arrivals for some time period after an initial event. The univariate Hawkes process is defined to be a point process N(t) having an intensity function λ(t) is defined as:

$$\lambda(t) = \mu + \alpha \sum_{t_l < t} \kappa(t - t_l)$$

where μ is the non-negative base intensity, a is the non-negative self-exciting coefficient, κ(•) is the decay function. The intensity captures the tendency of new events to occur within a time interval after t.

The multivariate Hawkes process is an extension of the univariate Hawkes process. The multivariate Hawkes process can be used to model the influence among individual dimensions. The intensity function of the $i^{th}$ dimension, based on past events, is defined as:

$$\lambda_i(t) = \mu_i + \sum_{(t_l < t)} \alpha_{ii_l} \kappa(t - t_l)$$

where $\mu_i$ is the base intensity of the $i^{th}$ dimension, $i_l$ is the dimension identity of the $l^{th}$ event, $\alpha_{ii_j}$ is a coefficient that captures the influence between the $i^{th}$ dimension and the $i_j^{th}$ dimension. A larger $\alpha_{ii_j}$ corresponds to a greater tendency of the $i_j^{th}$ dimension to trigger the $i^{th}$.

It is specifically contemplated that the decay function may be defined as $\kappa(x)=e^{-cx}$, where c is an exponential coefficient. It should be understood, however, that this particular definition is only exemplary—other choices for the decay function may be used instead.

The occurrence of a system event may be caused not only by mechanisms internal to a process of interest itself, but by the influence of events created by other processes. The degree of influence between different kinds of process may vary. For example, version control software tends to interact more with code editors than email clients. Therefore, events between version control software and code editors are more likely to be correlated. However, the innate character of each host process and the underlying triggering correlations among events are not known in advance. The present embodiments therefore learn the character of each host process as well as interactive tendencies between host processes from the observed individual events, discovering the triggering correlations between events.

At any given time $t_v$, for each pair of host process and target, the estimated tendency function $\lambda_{i,d}(t_v)$ indicates the tendency that a process i accesses a target d at time $t_v$. The estimated tendency function may be written as:

$$\lambda_{id}(t_v) = \delta_{id} + \sum_{p \in O_i}^{t_p < t_v} \alpha_i \kappa(t_v - t_p) + \sum_{j \in E/i} \sum_{q \in O_{jd}}^{t_q < t_v} b_{ij} \kappa(t_v - t_q)$$

where $\delta_{id}$ denotes the base tendency rate for the process i to access target d, $\alpha_i$ is a process-specific parameter modeling the impact of historical events on i's future behaviors, and $b_{ij}$ is a non-negative parameter representing how likely process j is to trigger processes i. Low-rank constraints are added to $\delta_{id}$. These constraints are based on the observation that interactions between processes and targets can be categorized into a limited number of types. $O_{jd}$ is the sequence of events executed by host process j on target d.

The intensity of system event sequences between the process i and the target b is captured by three separate terms. The first term captures the tendency of the process I to access the target d, the second term captures the influence of past events from the process I toward the current event, and the third term captures the influence of events from processes other than i toward the occurrence tendency of current events. The inter-process interactions may be carried out via some shared targets. As a result, the number of events from processes other than i that can potentially influence the current event can be narrowed down.

If $O_{jd}$ is the sequence of events carried out by host process j on target d, the negative log-likelihood for such observation is denoted as:

$$\mathcal{L}(O_{id}) = \\ -\sum_{v \in O_{id}} \log \lambda_{id}(t_v) + T_{id} \cdot \delta_{id} + \sum_{p \in O_{id}} a_i G(T - t_p) + \sum_{j \in E \setminus i} \sum_{q \in O_{jd}} b_{ij} G(T - t_q)$$

where $T_{id}$ is the timespan of this sequence and $G(t) = \int_0^t e^{-s} ds$. By the summation of all possible $O_{id}$, the negative log-likelihood of all observations can be determined.

Adding structural regularization terms to the negative log likelihood function, the following optimization is performed:

$$\min_{a,B,\Delta} \sum_{i=1}^{M} \sum_{d=1}^{N} \mathcal{L}(O_{id}) + \alpha \sum_{i=1}^{M} (a_i)^2 + \beta \sum_{i=1}^{M} \sum_{j=1}^{M} (b_{ij})^2 + \gamma \|\Delta\|_*$$

Such that $\alpha \geq 0$, $B \geq 0$, $\Delta \geq 0$. The terms $\alpha$, $\beta$, and $\gamma$ are hyper-parameters that are predetermined based on previous experience. There are furthermore three normalization functions, and the hyper-parameters control the weight of each. $\Delta$ is the matrix formed by $\delta_{ij}$.

To solve the optimization problem, an alternating direction method of multipliers (ADMM) framework is used to convert the original optimization problem into simpler sub-problems. The optimization problem is rewritten as an equivalent formulation using the auxiliary variable $Z_1 = \Delta$ as:

$$\min_{a,B,\Delta,Z_1} \sum_{i=1}^{M} \sum_{d=1}^{N} \mathcal{L}(O_{id}) + \alpha \sum_{i=1}^{M} (a_i)^2 + \\ \beta \sum_{i=1}^{M} \sum_{j=1}^{M} (b_{ij})^2 + \gamma \|Z_1\|_* + \rho tr(X_1^T (\Delta - Z_1)) + \frac{\rho}{2} \|\Delta - Z_1\|_F^2$$

such that $\alpha \geq 0$, $B \geq 0$, $\Delta \geq 0$, where $\rho$ is a penalty coefficient and $X_1$ is a dual variable associated with the constraints $\Delta = Z_1$, which can be solved iteratively by the following steps.

A first step updates $\alpha$, B, and $\Delta$. As $\mathcal{L}(O_{id})$ includes a sum of logarithm fractions, which do not have succinct derivative results, a surrogate approximation is introduced using Jensen's inequality to produce the following closed-form solutions:

$$\delta_{id} = \frac{-B_1 + \sqrt{B_1^2 - 4\rho C_1}}{2\rho}$$

$$a_i = \frac{-B_2 + \sqrt{B_2^2 - 8\alpha C_2}}{4\alpha}$$

$$b_{ij} = \frac{-B_3 + \sqrt{B_3^2 - 8\beta C_3}}{4\beta}$$

where:

$$B_1 = \rho X_{1,id}^k - \rho Z_{1,id}^k + T_{id}$$

$$C_1 = -\sum_{v \in O_{id}} p_{id}^\Delta$$

$$B_2 = \sum_{d=1}^{N} \sum_{p \in O_{id}} G(T_{id} - t_p)$$

$$C_2 = -\sum_{d=1}^{N} \sum_{v \in O_{id}} \sum_{\ell \in O_{id}}^{t_\ell < t_v} p_{ii}^a$$

$$B_3 = \sum_{d=1}^{N} \sum_{q \in O_{jd}} G(T_{id} - t_q)$$

$$C_3 = -\sum_{d=1}^{N} \sum_{v \in O_{id}} \sum_{\ell \in O_{id}}^{t_\ell < t_v} p_{ij}^b$$

and $\alpha$ is the vector of $\alpha_i$ and B is the matrix formed by $b_{ij}$.

The second step updates $Z_1$ using the updated parameters from the first step. This is performed by solving:

$$\min_{Z_1} \beta \|Z_1\|_* + \frac{\rho}{2} \|\Delta - Z_1^k + X_1^k\|_F^2$$

A closed form solution can be obtained by soft-thresholding:

$$Z_1^{k+1} = S_{\beta/\rho}(\Delta^{k+1} + X_1^k)$$

where $S(\bullet)$ is a soft-thresholding function defined as:

$$S_\alpha(X) = U \text{diag}((\sigma_i - \alpha)_+) V^T$$

where U and V are two square matrices and $\text{diag}(\bullet)$ is a matrix that has zeros for every element off the diagonal.

The third step updates the dual variable $X_1$ according to the ADMM framework: $X_1^{k+1} \leftarrow X_1^k + (\Delta^{k+1} - Z_1^{k+1})$. The following pseudo-code summarizes the optimization:

```
Randomly initialize a, B, Δ and set X_1 = 0.
while (a, B, Δ not converged) do
    update a, B, Δ by iteratively optimizing as described in the first step
    above
    update Z^{k+1} as described in the second step above
    update X_1^{k+1} ← X_1^k + (Δ^{k+1} - Z_1^{k+1})
end while
return a, B, Δ
```

Through event sequence modeling, $\alpha$, B, $\Delta$ are obtained that capture the inner-process and inter-process triggering patterns of every event. The correlation matrix $R=[r_{mn}] \in \mathbb{R}_+^{n \times x}$, where $r_{mn}$ represents how likely it is that the $n^{th}$ event will trigger the $m^{th}$ event. For a pair of events carried out by the same process, the strength of event triggering tendency are correlated to the self-influence factor of that process and the timespan between them. For a pair of events carried out by different processes, their interactions should be build upon accessing some shared targets historically. As such:

$$r_{mn} = \begin{cases} a_{i_m} \kappa(t_n - t_m) & \text{If } i_m = i_n \\ b_{i_m, i_m} \kappa(t_n - t_m) & \text{If } i_m \neq i_n \text{ and } d_m = d_n \\ 0 & \text{Otherwise} \end{cases}$$

By thresholding continuous event correlations, a directed event correlation graph $G=\{V, E, w\}$ can be constructed where each vertex $v \in V$ in the graph corresponds to an observed system event and each edge $e \in E$ corresponds to an event triggering correlation, which can be inferred from the system events. $w: V \to \mathbb{R}$ denotes a function that assigns a non-negative value $w(v)$ to each event v based on anomaly labels.

Block 302 thereby generates the event correlation graph G, which may include multiple connected components $\{G_1, G_2, \ldots\}$. If the malicious value of each connected component is written as $\{|w|_1, |w|_2, \ldots\}$, alerts that are not in the top-K connected components are treated as false positive alerts. Those connected components may still not be precise, however, so after generating the kill-chains, block 316 polishes them.

As noted above, block 312 discovers dense sub-subgraphs by finding a subset of correlated events $S \subset V$, for each connected component, that has a large maliciousness value and is sufficiently compact. More formally, the subset S maximizes the objective function:

$$Q(S) = \eta \sum_{v \in S} w(v) - \frac{1}{2} \sum_{m \in S} \sum_{n \in S} d(m, n)$$

where $\eta$ is a trade-off normalization coefficient and $d(m, n)$ stands for the distance of a shortest path through G from m to n, with $d(m, n)=\infty$ if there is no path from m to n through G.

Finding $S \subset V$ that minimizes Q(S) in general graphs is an NP-hard problem. The present embodiments therefore approximate the optimization using a linear-time ½ approximation based on a random double-greedy search. Because such an approximation needs the objective function to be non-negative, Q(S) is rewritten as follows:

$$Q^+(S) = \eta \sum_{v \in S} w(v) - \frac{1}{2} \left( \sum_{m \in S} \sum_{n \in S} d(m, n) + \sum_{p \in V} \sum_{q \in V} d(p, q) \right)$$

Finding a suitable trade-off parameter $\eta$ is important. The approximation is therefore extended by adding a strategy to automatically search for the optimal $\eta$. The following pseudo-code provides approximation details, where h(X) denotes the number of events with alert labels in event set X.

```
for k = 1, 2, . . . do
    X_0 ← Φ, Y_0 ← V
    for i = 1 to |V| do
        a_i ← max{Q^+(X_{i-1} ∪ {v_i}) - Q^+(X_{i-1}), 0}
        b_i ← max{Q^+(Y_{i-1} ∪ {v_i}) - Q^+(Y_{i-1}), 0}
        Draw δ ~ Bernoulli(a_i/(a_i + b_i), b_i/(a_i + b_i))
        if δ = 0 then
            X_i ← X_{i-1} ∪ {v_i}, Y_i ← Y_{i-1}
        else
            X_i ← X_{i-1}, Y_i ← Y_{i-1}\{v_i}
        end if
    end for
    if h(X) < h(V) then
        Increase η by η^{k+1} ← η^k · 2
    else
        Decrease η by η^{k+1} ← η^k/2
    end if
end for
return X_{|V|}
```

The kill chains inferred by this process may be too chaotic for interpretation by end users. The goal of block 316 is to keep the longest possible kill chain. Block 316 sorts the system events $v \in V$ in ascending order of timestamp. For each event v, block 316 finds the last event $l_v$ that may trigger v and deletes edges other than $(l_v, v)$ from G that point to v. The resulting polished kill chain is output by block 310 for use in subsequent analysis.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
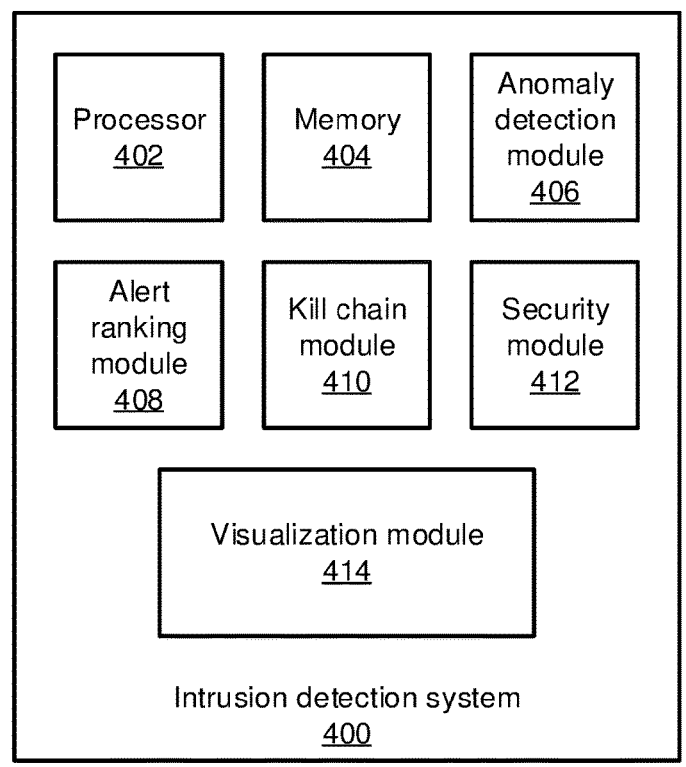
FIG. 4 is a block diagram of an intrusion detection system in accordance with an embodiment of the present principles.

Referring now to FIG. 4, an intrusion detection system 400 is shown. The intrusion detection system 400 includes a hardware processor 402 and memory 404. The intrusion detection system 400 further includes one or more functional modules that, in some embodiments, may be implemented as software that is executed by the hardware processor 402 and stored in the memory 404. In other embodiments, the functional modules may be implemented as one or more discrete hardware components in the form of, e.g., application specific integrated chips or field programmable gate arrays.

An anomaly detection module 406 analyzes collected host-level and network-level events and finds events that appear to be anomalous, generating an alert associated with the event. Kill chain module 410 correlates anomalous events and creates a graph representation, then generates and polishes kill chains from the graph.

A security module 412 performs manual or automated security actions in response to the kill chains. In particular, the security module 412 may have rules and policies that trigger when kill chains indicate certain kinds of attacker behavior. Upon such triggers, the security module 412 may automatically trigger security management actions such as, e.g., shutting down devices, stopping or restricting certain types of network communication, raising alerts to system administrators, changing a security policy level, and so forth. The security module 412 may also accept instructions from a human operator to manually trigger certain security actions in view of analysis of the kill chains.

A visualization module 414 presents kill chain and security management information to a user. The visualization module 414 in particular shows the events of the kill chain over time, relating them to one another in a manner that provides an easy-to-understand progression and potentially suggesting future attack paths. Based on the display of the kill chains at the visualization module 414, the user can trigger security management actions using the security module 412.

Figure 5:
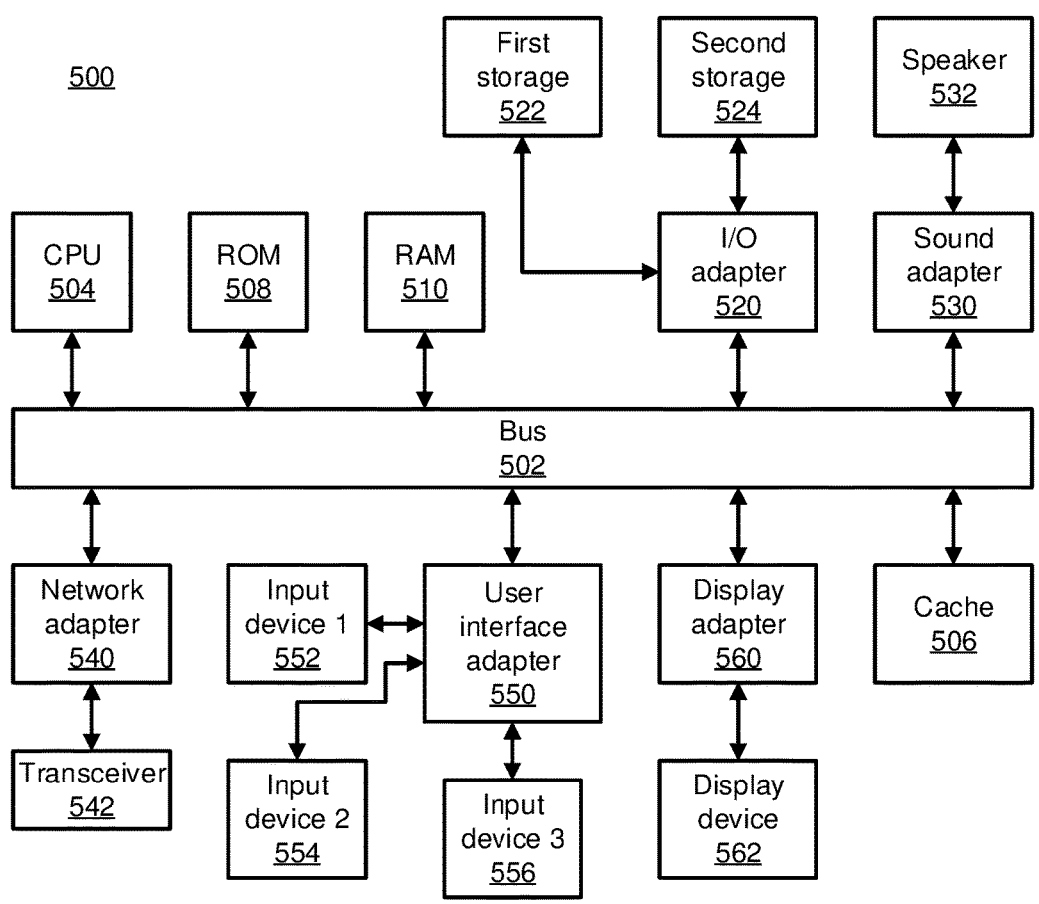
FIG. 5 is a block diagram of a processing system accordance with an embodiment of the present principles.

Referring now to FIG. 5, an exemplary processing system 500 is shown which may represent the transmitting device 100 or the receiving device 120. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting anomalous events, comprising:
  detecting anomalous events in monitored system data;
  generating an event correlation graph based on the monitored system data that characterizes by an estimated tendency function of processes to access system targets; and generating kill chains that connect malicious events, using a processor, over a span of time from the event correlation graph that characterize events in an attack path over time by sorting events according to a maliciousness value and determining at least one sub-graph within the event correlation graph with an above-threshold maliciousness rank; and performing a security management action based on the kill chains.

2. The method of claim 1, wherein determining the at least one sub-graph comprises maximizing an objective function Q:

$$Q(S) = \eta \sum_{v \in S} w(v) - \frac{1}{2} \sum_{m \in S} \sum_{n \in S} d(m, n)$$

where S is a subset of correlated events that maximizes the objective function, η is a trade-off normalization coefficient, v is a vertex, w(v) is a non-negative value, and d(m, n) is a distance of a shortest path through the event correlation graph from node m to n.

3. The method of claim 1, wherein determining the at least one sub-graph comprises maximizing an approximated objective function Q+:

$$Q^+(S) = \eta \sum_{v \in S} w(v) - \frac{1}{2}\left(\sum_{m \in S} \sum_{n \in S} d(m, n) + \sum_{p \in V} \sum_{q \in V} d(p, q)\right)$$

where S is a subset of correlated events that maximizes the objective function, η is a trade-off normalization coefficient, V is a square matrix, v is a vertex, w(v) is a non-negative value, and d(m, n) and d(p, q) is a distance of a shortest path through the event correlation graph from node m to n and node p to q, respectively.

4. The method of claim 3, wherein maximizing the approximated objective function comprises searching for a value for the trade-off normalization coefficient η that maximizes the approximated objective function.

5. The method of claim 1, further comprising pruning the generated kill chains, keeping a longest kill chain leading to a given event.

6. The method of claim 1, wherein performing the security action further comprises automatically performing at least one security action selected from the group consisting of shutting down devices, stopping or restricting certain types of network communication, raising alerts to system administrators, and changing a security policy level.

7. The method of claim 1, further comprising ranking the anomalous events according to a degree of suspicion.

8. The method of claim 7, further comprising removing anomalous events below a threshold rank.

9. The method of claim 1, further comprising displaying the kill chains on a graphical user interface for review by a user.

10. A system for detecting anomalous events, comprising:
an anomaly detection module configured to detect anomalous events in monitored system data;
a kill chain module comprising a processor configured to generate an event correlation graph based on the monitored system data that characterizes by an estimated tendency function of processes to access system targets and to generate kill chains that connect malicious events over a span of time from the event correlation graph that characterize events in an attack path over time by sorting events according to a maliciousness value and determining at least one sub-graph within the event correlation graph with an above-threshold maliciousness rank; and
a security module configured to perform a security management action based on the kill chains.

11. The system of claim 10, wherein the kill chain module is further configured to maximize an objective function Q:

$$Q(S) = \eta \sum_{v \in S} w(v) - \frac{1}{2} \sum_{m \in S} \sum_{n \in S} d(m, n)$$

where S is a subset of correlated events that maximizes the objective function, η is a trade-off normalization coefficient, V is a square matrix, v is a vertex, w(v) is a non-negative value, and d(m, n) is a distance of a shortest path through the event correlation graph from node m to n.

12. The system of claim 10, wherein the kill chain module is further configured to maximize an approximated objective function Q+:

$$Q^+(S) = \eta \sum_{v \in S} w(v) - \frac{1}{2}\left(\sum_{m \in S} \sum_{n \in S} d(m, n) + \sum_{p \in V} \sum_{q \in V} d(p, q)\right)$$

where S is a subset of correlated events that maximizes the objective function, η is a trade-off normalization coefficient, v is a vertex, w(v) is a non-negative value, and d(m, n) and d(p, q) is a distance of a shortest path through the event correlation graph from node m to n and node p to q, respectively.

13. The system of claim 12, wherein the kill chain module is further configured to search for a value for the trade-off normalization coefficient η that maximizes the approximated objective function.

14. The system of claim 10, wherein the kill chain module is further configured to prune the generated kill chains, keeping a longest kill chain leading to a given event.

15. The system of claim 10, wherein the security module is further configured to automatically perform at least one security action selected from the group consisting of shutting down devices, stopping or restricting certain types of network communication, raising alerts to system administrators, and changing a security policy level.

16. The system of claim 10, further comprising an alert ranking module configured to rank the anomalous events according to a degree of suspicion.

17. The system of claim 16, wherein the alert ranking module is further configured to remove anomalous events below a threshold rank.

18. The system of claim 10, further comprising a visualization module configured to display the kill chains on a graphical user interface for review by a user.

* * * * *